Sept. 6, 1932.  T. DANIELS  1,875,567

WRAPPING MACHINE

Filed March 25, 1931

Inventor:
T. DANIELS

Patented Sept. 6, 1932

1,875,567

UNITED STATES PATENT OFFICE

THEO DANIELS, OF WEVELINGHOVEN, GERMANY

WRAPPING MACHINE

Application filed March 25, 1931, Serial No. 525,312, and in Germany April 19, 1930.

The present invention has reference to a machine for wrapping tablets which are arranged side by side to form a column. It is especially applicable when a specific number of tablets are conveyed to the machine to be wrapped at each operation.

An object of the present invention is to provide a machine having a recessed rotary drum wherein a plurality of rollers are situated in a recess of said drum, co-operating recessed feed rollers for feeding a column of tablets to the drum and a rolling up surface partly encircling said drum to cause the column of tablets, brought into contact therewith by rotation of the drum, to rotate and so become encased in a wrapper of suitable material such as paper or tin foil delivered to the recess in the drum.

A second object of the invention is to provide a machine having mutually acting presser members mounted at the ends of one or both feed rollers for ensuring the tight packing of the tablets.

Other objects of the invention will readily be appreciated from the following description with reference to the accompanying drawing.

The new apparatus for wrapping tablets is extremely efficient and works with undeviating reliability. It saves a very great amount of labor which up to the present has been necessary for the wrapping of tablets.

A machine for wrapping tablets constructed in accordance with the present invention is shown by way of example in the accompanying drawing, in which.

Figure 1:
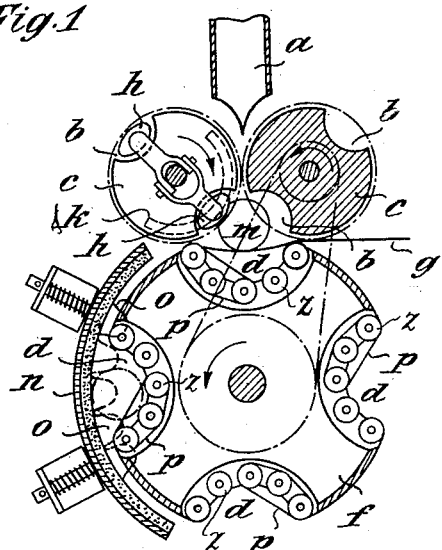
Figure 1 is a side view, partly in cross section.
Figure 2:
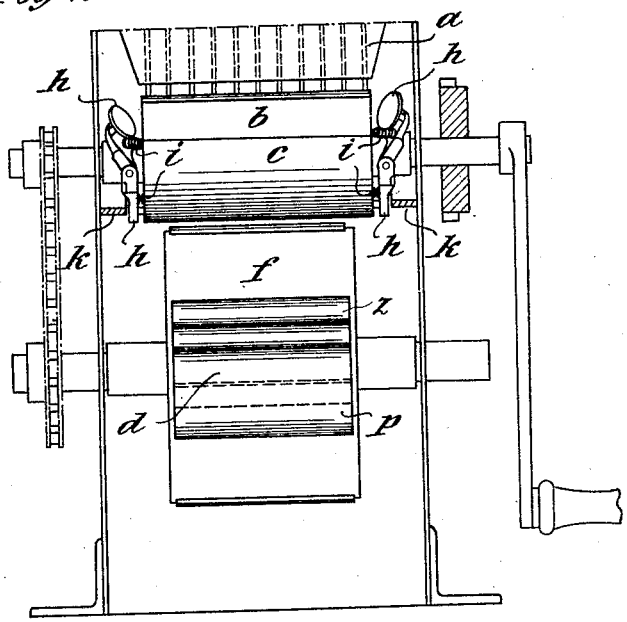
Figure 2 is a front elevation with the rolling up surface removed.

Flat circular tablets are fed to the apparatus through sheet metal channels $a$, so that the tablets of each batch are arranged side by side and form a column which in the drawing has a cylindrical form and is received by co-operating trough shaped recesses $b$, formed in the surface of two rollers $c, c$. The rollers $c, c$ run in opposite directions at the same peripheral speed, and, in the course of their rotation, feed the column of tablets into one of the trough shaped recesses $d$, of a third roller or drum $f$. A number of rollers $z, z$ are arranged around the surface of the recesses $d$ and a sheet of paper or tin foil $g$ is placed in position in the recess $d$ prior to the insertion therein of the column of tablets $m$. An endless rubber band $p$ passes around the three leading rollers $z$ in each recess $d$. Pressers $h$ are provided at the ends of the rollers $c, c$ and act mutually to engage the ends of a column of tablets whilst it is in the recesses $b$, so that the tablets are pressed closely together and arrive in the recess $d$ in a compact form for wrapping. A presser $h$ is provided for each end of each recess in the lefthand roller $c$ (Figure 1). The pressers are normally held out of the recesses $b$ by means of compression springs $i$. The pressers are moved into the ends of a recess $b$, to grip the column of tablets therein, by the engagement of their rear faces with semicircular cams $k$ fixed to the stationary frame of the machine, that is, as the roller rotates the presser is brought into the plane of the cam and moved into tablet-engaging relation. The pressers in the lowermost recess of the particular roller $c$ are shown in operative position through control by the cam $k$ and the lower portion of the roller $c$ of Figure 2.

During the transference of a column of tablets from recesses $b$ in the rollers $c$ to a recess $d$ in the drum $f$, the tablets are moved by the edge of the recess $b$ in the left hand roller $c$, and by the pressers $h$ onto the leading end of the wrapping strip $g$ which lies over the endless rubber band $p$ so that the pressure between the band $p$ and the edge of the recess $b$ acts on the tablets to hold them so that they may not fall away from one another, but keep their correct positions relatively to one another in a column.

The column of tablets $m$, when in the recess $d$ and lying on the leading edge of the wrapping sheet $g$, is carried, by the rotation of the drum $f$, into contact with a resilient surface $n$ which partially encircles the drum $f$. The column of tablets $m$ is thus itself rotated and becomes wrapped in the sheet of tin foil or paper $g$. The overlapping edges of the tin foil or paper wrapper are turned down or folded in well known manner by stops $o$ provided at both longitudinal edges of the rolling up surface $n$. The completed wrapped column of tablets then reaches the lower edge of the rolling up surface $n$ and falls into a collector arranged beneath, or on to a conveyor belt which carries it away. The endless bands $p$ which pass around the three leading rollers $z$ in the recesses $d$ prevent the ends of the tinfoil or paper wrapping sheets from being caught between the rollers $z$, and during the wrapping operation, the bands are free to be moved by the rotation of their rollers.

I claim:

1. A machine for wrapping tablets comprising in combination a recessed rotary drum, a plurality of rollers situated in a recess in said drum, co-operating recessed feed rollers for feeding a column of tablets to said recess in said drum, together with a rolling up surface partly encircling said drum to cause the column of tablets, brought into contact therewith by rotation of the drum, to rotate and so become encased in a wrapper delivered to said recess in said drum.

2. A machine for wrapping tablets as claimed in claim 1, including presser members mounted at the ends of the feed rollers, spring means for holding said presser members in an inoperative position and cam members for pressing said presser members into an operative position, said presser members engaging the ends of a column of tablets when in the recesses of said feed rollers and ensuring tight packing of said tablets.

In testimony whereof I have signed my name to this specification.

THEO DANIELS.